United States Patent [19]
Brewington

[11] 3,825,324
[45] July 23, 1974

[54] REMOTELY CONTROLLED MIRROR AND POWER AMPLIFIED DRIVE MEANS THEREFOR

[76] Inventor: Harold G. Brewington, P.O. Box 176, Widener, Ark. 72394

[22] Filed: June 13, 1972

[21] Appl. No.: 262,201

[52] U.S. Cl. ............... 350/289, 74/501 M, 350/304
[51] Int. Cl. ............................................. G02b 5/08
[58] Field of Search .......... 74/501 M; 350/288, 299, 350/302, 289, 303, 304, 307

[56] References Cited
UNITED STATES PATENTS

| | | | |
|---|---|---|---|
| 2,758,508 | 8/1956 | Petri et al. | 350/289 |
| 3,469,901 | 9/1969 | Cook et al. | 350/289 |
| 3,640,609 | 2/1972 | McKee | 350/289 |

*Primary Examiner*—Ronald L. Wibert
*Assistant Examiner*—Michael J. Tokar
*Attorney, Agent, or Firm*—Roylance, Abrams, Berdo & Kaul

[57] ABSTRACT

An apparatus for remotely controlling, from the inside of a vehicle, the position of a side-view mirror mounted on the outside of the vehicle. The apparatus includes a support for rotatably mounting a mirror to a vehicle, an electrical, hydraulic, or pneumatic power amplified driving mechanism for rotating the mirror to the desired position, and associated control devices for controlling the driving devices.

5 Claims, 5 Drawing Figures

REMOTELY CONTROLLED MIRROR AND POWER AMPLIFIED DRIVE MEANS THEREFOR controlling the This invention relates to remotely controllthe position of side-view mirrors on vehicles. More particularly, it relates to apparatus for remotely controlling the position of a side-view mirror by means of electric, hydraulic, or pneumatic power-amplified driving devices, and to the fluid-actuated driving means therefor.

The side-view mirrors mounted on various commercial vehicles are usually in a position spaced from the operator of the vehicle so that manual adjustment of the mirrors is impossible while the operator remains inside the vehicle. On most of these vehicles, such as large trailer trucks and tractors, the side-view mirror on the driver side can be three or four feet in front of him and the side-view mirror on the side of the vehicle opposite the driver can be as much as ten feet away from the driver. Additionally, most state laws provide that a car pulling a trailer be provided with large outboard side mirrors which are located on the front fender, thus being spaced some three or four feet from the driver or any of the passengers. The manual adjustment of such remotely-positioned mirrors is impossible while the vehicle is being driven.

Various attempts have been made in the past to overcome this unadjustability of various mirrors which are out of reach by utilizing mechanical linkages to provide for the remote control of the mirror's position. However, the use of any such mechanical linkage is severely limited in operation when the distance between the user and the mirror is great. When the distance is more than two or three feet, the linkage becomes cumbersome and will allow a substantial play in that linkage. This, of course, will not allow an instantaneous adjustment in the mirror's position and also will not allow a very accurate positioning to be accomplished. It would be highly desirable to have the capacity to remotely control the position of the mirror while the vehicle is in operation. For example, in many instances upon angular entry from an access road onto a main roadway, the merging traffic is not ordinarily visible without an adjustment of the mirror angle. In such usage, the position of the mirror must be quickly and accurately adjusted to the desired position. Otherwise, any advantage that could be gained by the use of the mirror would be lost.

It is, therefore, an object of the present invention to provide a new and improved apparatus for the remote control of a side-view mirror which can be efficiently and accurately positioned at virtually any distance from the driver of the vehicle.

It is a further object of the present invention to provide an apparatus for accurately positioning a side-view mirror by remote control wherein the changing of the position will be essentially instantaneous.

Another object of the present invention is to provide an apparatus for accurately positioning a side-view mirror located on the outside of a vehicle by remote control from the inside of the vehicle.

It is a further object of the present invention to provide an apparatus for remotely controlling the position of a side-view mirror wherein the mirror can be rotated through at least 240°.

Another object of the present invention is to provide electrical, hydraulic, and pneumatic power amplified driving devices for adjustably positioning a remotely positioned mirror by remote control, wherein provision is made for assuring that once the mirror is correctly positioned, it will remain in that position until it is desired to change that position.

Other objects, advantages, and salient features of the present invention will become apparent from the following detailed description, which, taken in conjunction with the annexed drawings, discloses a preferred embodiment of the present invention.

Referring now to the drawings which form a part of this original disclosure:

The foregoing objects are attained by providing a support bracket mounted to the vehicle for rotatably supporting two shafts upon which the mirror is mounted. A drive means, located within the support bracket, is coupled to one of the shafts and can rotate it. The drive means can be fluid actuated, i.e., either pneumatic or hydraulic, and are controlled by a series of valves. The fluid actuating drive means is connected to one of the shafts mounting the mirror by means of a rack and pinion connection, wherein the rack is mounted at one end of a piston and the pinion mounted at one end of one of the shafts. The drive means can also be electrical and can include a reversible electrical motor connected by means of a series of reducing gears and a chain to a sprocket located on one of the shafts and an electro-magnetic brake for the motor shaft to prevent the mirror from rotating out of its correct position.

Figure 1:
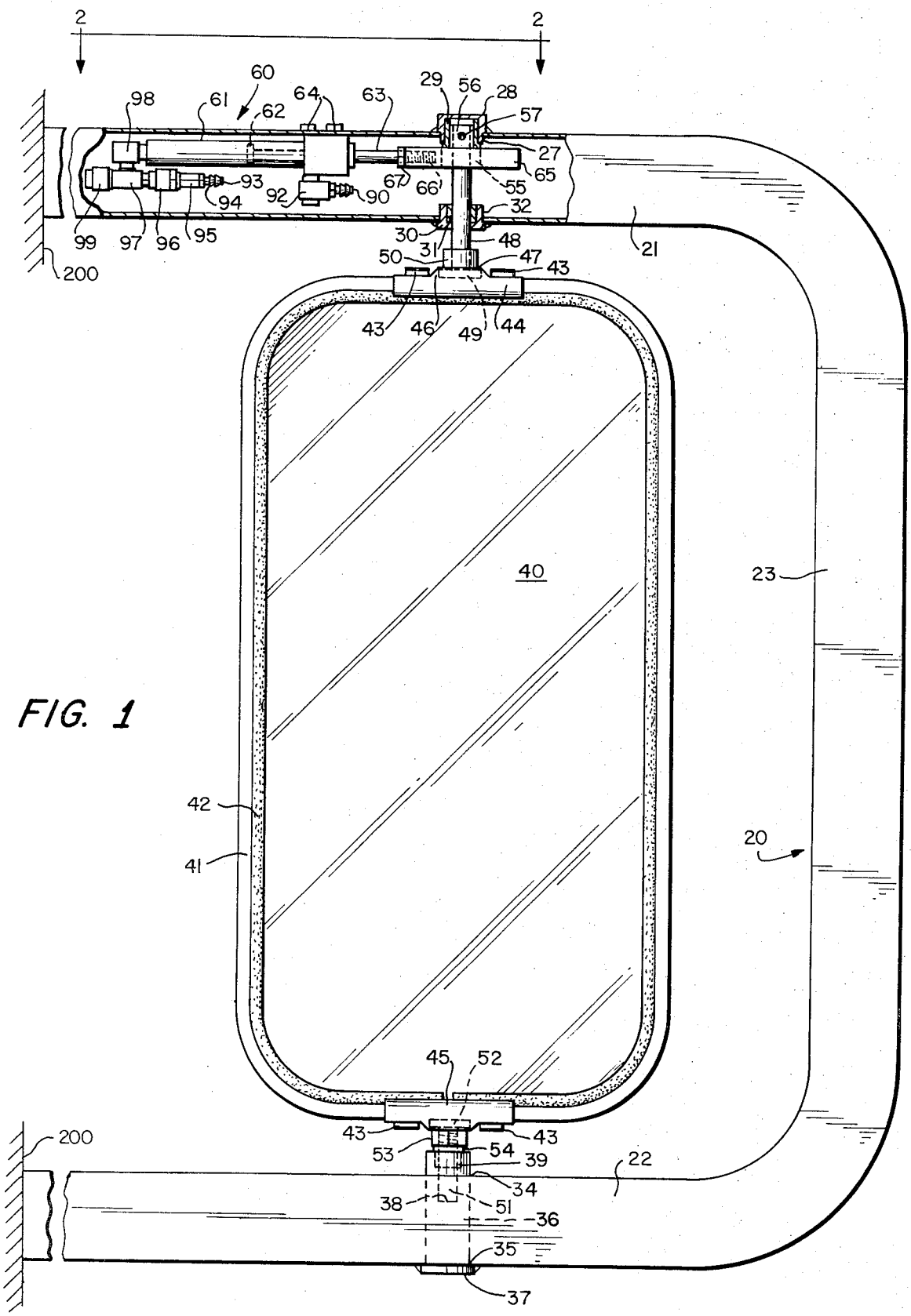
FIG. 1 is an elevational view partially in section of an apparatus in accordance with the present invention showing a fluid actuated drive means.

Referring to the drawings in further detail, an apparatus in accordance with one embodiment of the present invention is generally designated 10 as seen in FIG. 1 and generally consists of a supporting bracket 20, a mirror 40, and a fluid actuated drive 60.

As seen in FIG. 1, the supporting bracket 20 is formed from tubing having a square cross section and bent into a U-shaped configuration. The U-shaped configuration and the square cross section are shown only by way of example, and any desired configuration or cross section, e.g., circular, eliptical, etc., may be used. The supporting bracket 20 has a top portion 21 and a bottom portion 22 which are positioned essentially horizontal to the ground. Connecting the top and bottom portions of the supporting bracket is a mid-portion 23 which is oriented essentially vertical to the ground. The ends 24 and 25 of the top and bottom portions of the supporting bracket which are spaced from the mid-portion are fastened to the vehicle 200 in any suitable manner.

Figure 2:
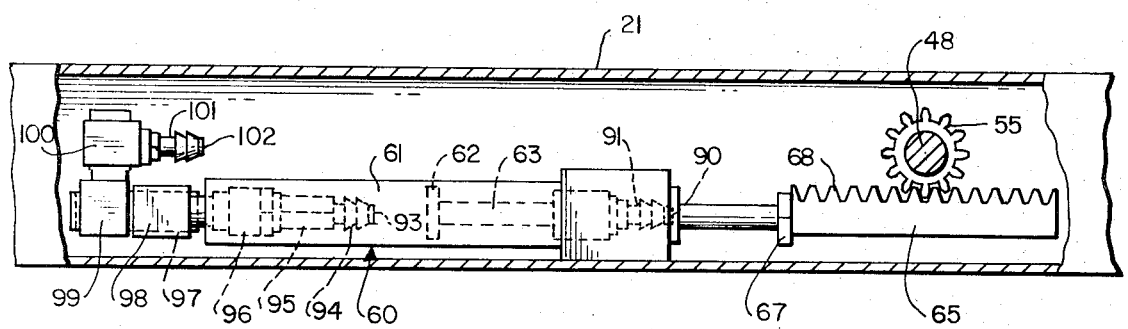
FIG. 2 is a sectional view of the fluid actuating drive means taken substantially along the lines 2—2 of FIG. 1.

As seen in FIG. 1 mirror 40 is rotatably supported to bracket 20 by means shafts 48 and 51. Rigidly mounted on the shaft 48 is a spur gear 55. Fluid-actuated drive means 60 will now be discussed in detail with reference to FIG. 2. As seen in FIG. 2, the fluid actuated drive 60 comprises a fluid containing cylinder 61, a piston 62 and a piston shaft 63. The fluid containing cylinder 61 is rididly mounted to the top surface of the top portion 21 of the supporting bracket 20 by means of bolts 64 as shown in FIG. 1.

The piston shaft 63 has at its one end, and rigidly connected thereto, a piston 62 which is located within the fluid-containing cylinder 61 and at its other end located outside the cylinder 61 a rack 65. The end of the piston shaft 63 which receives the rack 65 is suitably threaded to coincide with an internally threaded bore 66 at one end of the rack 65. A nut 67 is additionally threaded on shaft 63 adjacent the bore 66 to rigidly secure the connection between the piston shaft and the rack. As shown in FIG. 2, the rack 65 may be an elongated plate having a square cross section and a series of teeth 68 on the one side thereof, which teeth mesh with the teeth on the spur gear 55 which is in turn rigidly attached to the shaft 48. Thus, any translational movement of the rack 65 will cause a concomitant rotation of the spur gear 55, the shaft 48 and, thus, the mirror 40. The amount of rotation can be any desired angular distance depending on the length of the piston shaft and preferably will be at least 120° in either direction.

Translational movement is provided to the rack 65 according to one embodiment of the present invention by means of fluid pressure on either side of the piston 62 located within the fluid-containing cylinder 61.

As seen in FIGS. 1 and 2 the fluid containing cylinder 61 has an inlet 90 at the end of a barbed fitting 91 which communicates with the cylinder 61 by means of a universal elbow 92. Located adjacent the other end of the cylinder is an inlet 93 which communicates with the container 61 via a barbed fitting 94, a connector 95, a check valve 96, a T-fitting 97, and elbow 98. Additionally, as seen in FIG. 2, an outlet 102 is provided from the cylinder 61 through the elbow 98, the T-fitting 97, a universal elbow 99, a universal elbow 100, and a barbed fitting 101. Outlet 102 is positioned at the end of the barbed fitting 101.

Figure 3:
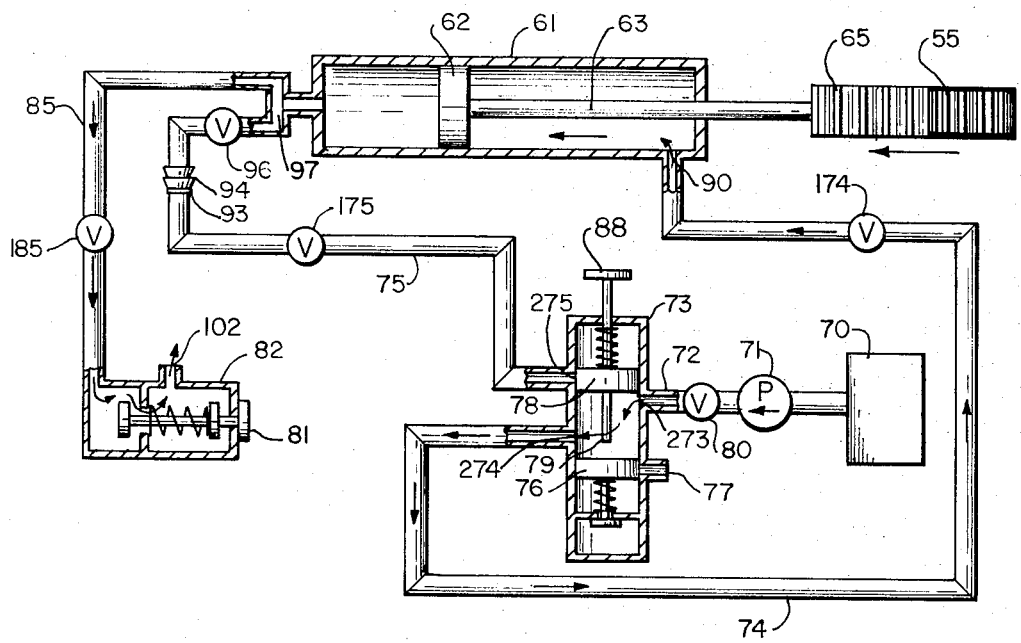
FIG. 3 is a schematic view of the fluid actuated drive system moving the shaft in the direction shown.

Referring to FIG. 3, the control system for the fluid actuated drive is schematically shown. This fluid can be a gas or a liquid. A fluid supply means 70, such as a storage tank, reservoir, or the atmosphere, and a conventional pump 71 for the fluid are connected to various conduits leading to the cylinder 61 for providing fluid under pressure which will be selectively conducted to drive the piston 62. The fluid leaving the pump 71 flows through a first conduit 72 past a one-way check valve 80 and then into a four-way valve 73 through inlet 273. Leading from the four-way valve 73 is a second conduit 75 communicating with the cylinder 61 via inlet 93. Located in conduit 75 is a one-way entrance check valve 96 which allows fluid to flow into the cylinder 61 but not in the opposite direction. A third conduit 74 leads from the four-way valve 73 to the inlet 90 in the cylinder 61. Leading from the cylinder 61 in a position on the same side of the piston as inlet 93 and connected to conduit 75 via T-fitting 97 is a fourth conduit 85 which terminates in a one-way exit valve 82 having an outlet 102 leading to the atmosphere or back to the tank 70. Conduits 73, 74 and 85 each have a flow control valve 173, 174, and 185 located therein to slow down the fluid flowing therethrough so that the piston will not move in either direction too quickly.

As viewed in FIG. 3 the four-way valve 73 is in its rest position and will allow fluid to flow from conduit 72 through the valve into conduit 74 via dual functional inlet-outlet 274 (acting as an inlet at this time). A spring loaded disc 76 will, in the rest position, cover an exit opening 77 in the valve 73. The flow of the fluid from conduit 72 into the four-way valve 73 will be prevented, in the rest position, from entering conduit 75 by a spring loaded disc 78 which is interposed in front of the entrance inlet 275 to the conduit 75. An extension 79 mounted on the bottom end of and perpendicular to disc 78 can engage the disc 76 when the spring loaded button 88 is depressed and allow fluid to pass from conduit 72 through the valve and into conduit 75 while at the same time closing off the entrance to conduit 74 and opening the exit 77 to the atmosphere or to a conduit leading to the tank 70. Valve 73 may be positioned inside the vehicle at a location convenient to the driver for easy access to button 88.

As seen in FIG. 3 a one-way exit valve 82 prevents fluid from flowing out of conduit 85 and through the outlet 102 unless the button 81 is depressed, which when depressed allows the fluid to escape to a tank or the atmosphere. Likewise, valve 82 may be positioned inside the vehicle at a convenient location for access to button 81.

In operation, the pump 71 is turned on and will cause hydraulic fluid contained in storage tank 70 or air from the atmosphere to be pumped through valve 80, and into conduit 72. As seen in FIG. 2, the spur gear 55 is located in a meshing engagement with the teeth 68 of the rack 65. If the operator of the vehicle desires to rotate the mirror 40 in a direction clockwise as viewed from the top in FIG. 1, the rack 65 must be moved in a leftward direction as viewed in FIG. 3. This is accomplished by moving the piston 62 located within the cylinder 61 in a leftward direction as viewed in FIG. 3. Since at the rest position, i.e., without button 88 being depressed, the four-way valve 73 allows fluid to pass from conduit 72 and into conduit 74 but not into conduit 75, the fluid will enter inlet 90 in the cylinder 61 under the pressure of the pump 71. At this time the operator can depress the conveniently located button 81 in the valve 82. This will allow the fluid pressure to push the piston 62 to the left as viewed in FIG. 3 since the valve 82 is now open and any fluid contained in that part of the cylinder 61 to the left of piston 62 as viewed in FIG. 3 may exit through the outlet 102. Of course, no fluid may flow out of the cylinder 61 into the conduit 75 because the valve 96, as mentioned above, is a one-way valve allowing fluid to only enter the cylinder 61. Thus, since the outlet 102 (which is open to the atmosphere or communicates with a storage tank) provides a reduced pressure to the fluid in conduit 85 than that in conduit 74, the piston will be moved to the left. Concomitantly, the rack 65 connected at the end of the shaft 63, which is connected to the piston 62, will be moved to the left as viewed in FIG. 3. This movement of the rack 65 will cause a rotation of the spur gear 55 in the clockwise direction. Thus, rotating the mirror to which the spur gear is attached also in the clockwise direction. This rotation can be halted at any time by merely releasing the depressed button 81 on the valve 82. Of course, the rotation will be limited by the length of the cylinder 61 whose ends will abut the piston when the shaft is fully extended in either direction.

Figure 4:
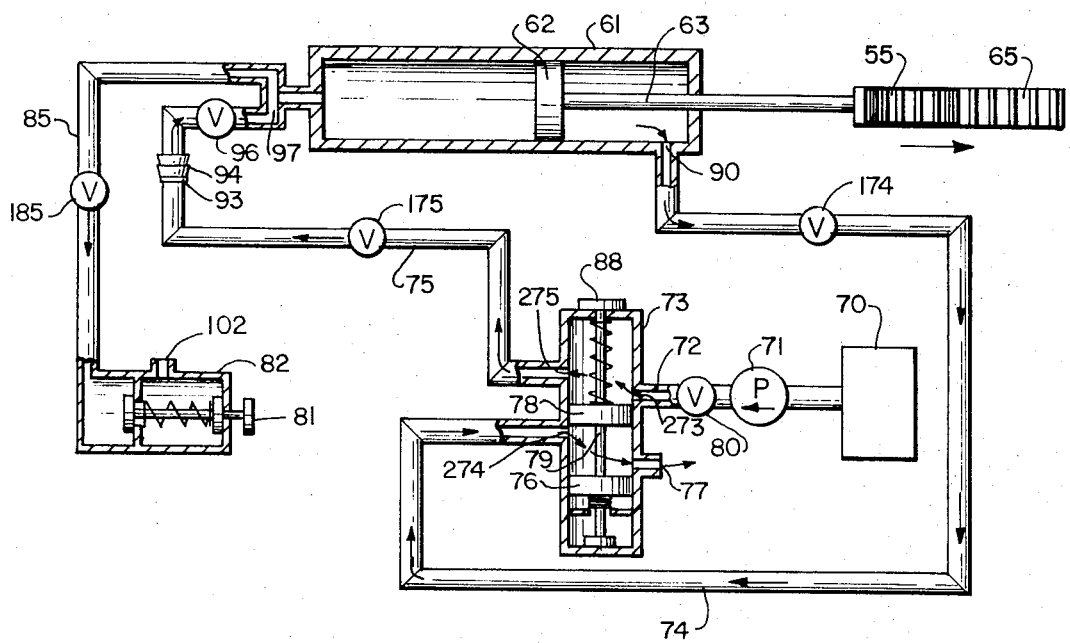
FIG. 4 is a schematic view of the fluid actuated drive system driving the shaft in a direction opposite to that shown in FIG. 3.

If the vehicle operator desires to move the mirror in the counterclockwise direction as viewed from the top in FIG. 1 then the rack 65 must be moved to the right as viewed in FIGS. 2, 3 and 4.

Referring now to FIG. 4, such movement can be accomplished by depressing button 88 on valve 73 while leaving button 81 on valve 82 in its rest position, in which position valve 82 is closed. The depression of button 88 will cause the disk 78 to move downwards from its blocking position adjacent conduit 75 inlet 275 and in a position to block the flow of fluid from conduit 72 into conduit 74 dual functioning inlet-outlet 274. This depression will also cause the rod 79 located on the bottom of disk 78 to come in contact with and depress the disk 76, which in its rest position blocks the outlet 77, to a position opening outlet 77 to the main valve portion of valve 73. In this position, the fluid flowing from the pump 71 will pass from conduit 72 into conduit 75 via inlet 275 and pass via inlet 93 across the valve 96 into the lefthand portion of the cylinder 61 as viewed in FIG. 4. Any fluid, in the cylinder attempting to flow out conduit 85 will be prevented from being released by the closed valve 82. Thus a fluid pressure will build up on the lefthand side of the piston 62 as shown in FIG. 4. The disk 78 in its extended position as shown in FIG. 4 will block conduit 74 from direct flow from conduit 72; however, it will additionally open outlet 77 as mentioned above and also allow a passageway to remain open, such passageway communicating between conduit 74 and outlet 77. Thus, the pressure on the lefthand side of the piston 62 in the cylinder 61 caused by fluid flowing through conduit 75 and valve 96 will cause the piston 62 to move towards the right as shown in FIG. 4 because any fluid located to the right of the piston 62 will be forced out of the cylinder 61 via opening 90 and will flow along conduit 74 past dual functioning inlet-outlet 274 (functioning now as an outlet for conduit 74) and out outlet 77 which communicates thereto by means of the valve 73 as shown in FIG. 4. The piston 62 therefore will be travelling to the right as viewed in FIG. 4 along with piston shaft 63 and rack 65. This movement of rack 65 will rotate the spur gear 55 in the counterclockwise direction as viewed in FIG. 2 which in turn will rotate shaft 48 counterclockwise and additionally the mirror 40. The button 88 may be depressed for as long as it is desired to rotate the mirror in the counterclockwise direction. Of course, the counterclockwise direction will be limited when the piston 62 comes to its final abutting position against the righthand end of the cylinder 61. The rack 65 and spur gear 55 are so dimensioned to provide at least 120° of shaft 48 rotation in either clockwise or counterclockwise directions.

Figure 5:
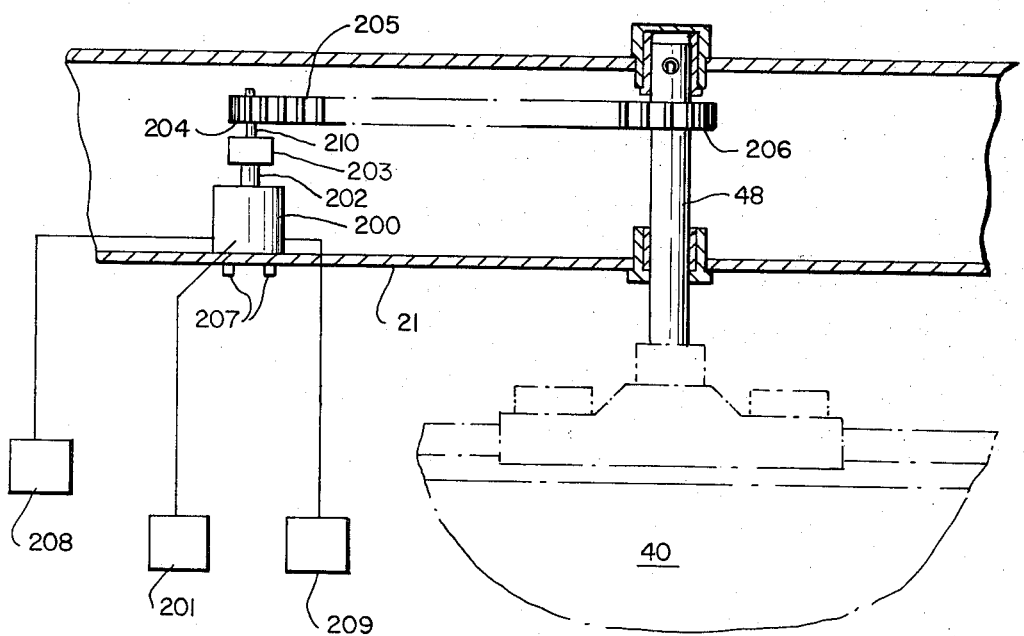
FIG. 5 is a schematic elevational view of an electrical actuating drive means in accordance with the present invention.

A second embodiment in accordance with the present invention is schematically shown in FIG. 5. All of the supporting structure shown in FIG. 1 remains the same and is shown with the same character numerals. In this second embodiment rather than utilizing a fluid actuated power amplified drive system, an electrical power amplified drive system is provided. As seen in FIG. 5 a reversible motor 200 is rigidly secured on the inside of the supporting bracket top portion 21 by means of bolts 207. A motor armature or shaft 202 extends from the motor and is connected to a series of reducing gears 203. Mounted on a shaft 210 extending from the series of reducing gears 203 is a sprocket 204. This sprocket 204 which is rigidly secured to the shaft 210 will be rotated by the reversible motor at a very slow rate of angular velocity. The shaft 48 which is rigidly connected to the mirror 40 has rigidly mounted thereon a sprocket 206 which is similar to spur gear 55. Connecting the sprocket 204 mounted on shaft 210 and sprocket 206 mounted on the shaft 48 is a chain link belt 205. This connection of course will provide an angular rotation to the shaft 48 in response to an angular rotation of the sprocket 204.

An electrical source 201, such as that provided in any motor driven vehicle, is connected to the motor 200 and will provide the necessary power output for rotating the shaft 202. As stated above, the motor 200 is reversible, i.e., it can provide rotation to the shaft 202 in either angular direction. Additionally motor 200 is provided with an electromagnetic brake mounted to the armature 202 in a releasable connection. This motor and brake and conventional in construction and are typical of the types of motors which on actuation will release a brake holding the armature and allow the motor to rotate the armature. Concommitantly, when the motor's actuation is ended the brake will once again move into a holding relationship with the armature.

Switch 208, as seen in FIG. 5, when actuated, will cause the brake located within the motor 200 to release its connection with the armature 202 and allow the motor to rotate the shaft 202 in one direction. The switch 209 also accomplishes the same function of starting the motor and releasing the brake. However, it causes the motor to rotate the shaft 202 in an opposite direction from that of switch 208.

In operation, the second embodiment shown in FIG. 5 will cause the sprocket 206, and therefore the shaft 48, to rotate in either direction as long as either switch 208 or 209 is actuated. This rotation can continue until the mirror 40 connected to the shaft 48 is positioned as desired.

Referring again to FIG. 1, a cylindrical bore 27 is formed in the top surface of the top portion 21 for partially receiving a cylindrically-shaped bearing retainer 28 which consists of a right cylinder having a closed top end and an opened bottom end with a portion of the outer cylindrical surface having an increased diameter which is larger than the diameter of the cylindrical bore 27. Thus, the cylindrical bore receives the portion of the bearing retainer below the increased diameter and has the open end of the bearing retainer communicating with the interior of the supporting bracket. Lining the interior surface of the bearing retainer is a ring-shaped brass bearing 29. The bearing retainer 28 is rigidly connected to the upper surface of the top portion 21 of the supporting bracket by means of welding. A similar bearing retainer 230 and brass bearing 31 are received in a cylindrical bore 32 located on the bottom surface of the top portion 21 directly below the cylindrical bore 27. The bearing retainer 30 is similar to the bearing retainer 28; however, rather than having one closed end and one open end, it has two open ends for receiving a shaft as will be hereinafter described.

The bottom portion 22 of the supporting bracket 20 has therein two cylindrical bores 34 and 35, located directly below the cylindrical bores 27 and 32, for receiving a cylindrical rod 36 having an enlarged head 37 and a blind central bore 38 at opposite ends. The cylindrical rod 36 is rigidly mounted to the bottom surface of the bottom portion 22 by welding the enlarged head to that surface and the central bore 38 is enlarged to receive a ring-shaped bearing 39 which will receive along with the remaining portion of the central bore 38 another shaft 51 mounted to the mirror as will be hereinafter described.

The mirror 40 is conventionally mounted within a mirror frame 41 having a rubber binding 42 interposed between the mirror and the frame. Rigidly fastened to the top and bottom of the mirror frame 41 by means of screws 43 are two brackets 44 and 45. The bracket 44 which is located on the top of the mirror frame 41 defines a cavity 46 between its surface and the top of the mirror frame 41. A cylindrical bore 47 is formed on the top of the bracket 44 and receives one end of a shaft 48 which has an enlarged head 49 lying within the cavity 46 for preventing the shaft from being pulled from its connection to the bracket 44. The shaft 48 is threaded along the portion just above the enlarged head 49 and receives thereon a nut 50 which will rigidly connect the shaft 48 to the bracket 44. A similar connection of a bottom shaft 51 to the bottom bracket 45 is accomplished by means of an enlarged head 52 on one end of the shaft 51 and a nut 53.

The bottom shaft 51 fits into the cylindrical bore 38 and is surrounded by the brass bearing 39 along part of its length. Additionally, interposed between the nut 53 and the top of the cylindrical rod 36 is a annular shaped brass bearing 54. This mounting of the shaft 51 thus allows for a rotational movement of the shaft relative to the bottom portion 22 of the supporting bracket 20.

The top shaft 48 has rigidly connected at its top end a spur gear 55 and a cylindrical extension 56, integrally formed with the spur gear. The spur gear and cylindrical extension each have a central bore therein for receiving the uppermost portion of the shaft 48 and are rigidly connected to the shaft by means of a pin-spring 57 passing through suitably drilled transverse bores in the extension 56 and the shaft 48. As shown in FIG. 1, the shaft 48 passes first through the brass bearing 31 in the bearing retainer 30 and is rotatably mounted within the brass bearing 29, which receives the cylindrical extension 56 to which the shaft 48 is connected.

Thus, the mirror 40 will be rotatably mounted on the supporting bracket 20 by means of the shaft 48 being received in the bearing 31 and bearing 29 and the shaft 51 being received in the bearings 39 and 54. Additionally, both vertical and horizontal translational movement of the mirror will be prevented due to the shafts being received in the various bearing retainers 28 and 30 and the cylindrical rod 36.

"Power amplified drive means" as employed herein is intended to include the fluid actuated system of FIGS. 3 and 4 and the electrical system of FIG. 5; however, this does not include a mechanically actuated system.

While two advantageous embodiments have been chosen to illustrate the invention, it will be understood by those skilled in the art that various changes and modifications can be made therein without departing from the scope of the invention as defined in the appended claims.

What is claimed is:

1. An apparatus for remotely controlling the position of a mirror mounted on the outside of a vehicle comprising:

a mirror;
support means for said mirror mounted on said vehicle, said support means including a hollow bracket;
means for rotatably mounted said mirror on said support means;
power-amplified drive means for rotating said mirror; and
control means associated with said drive means for actuating said power-amplified drive means and controlling the degree of rotation of said mirror,
said means for rotatably mounting including two shafts, each fixedly mounted at one end to said mirror and rotatably mounted in said support means, one of said shafts having a spur gear fixedly mounted thereon within said support means,
said drive means being fluid actuated and including a fluid containing cylinder mounted within said support means, and
a piston shaft having a piston at one end received in said cylinder and a geared rack at the other end engaging said spur gear.

2. An apparatus according to claim 1,
said fluid actuated drive means further including
a fluid supply, and
conduit means for connecting said fluid containing cylinder and said fluid supply;
said control means including valve means, coupled to said conduit means, for selectively conducting fluid from said fluid supply to said fluid containing cylinder;
said valve means comprising first and second valves;

said first valve having a first inlet communicating with said fluid supply, a first outlet communicating with the non-shaft side of said cylinder, a second outlet, and a dualfunctional inlet-outlet communicating with the shaft side of said cylinder,
said second valve having a second outlet communicating with the non-shaft side of said cylinder and a third outlet,
whereby actuation of said first valve causes said mirror to rotate in a first direction and actuation of said second valve causes said mirror to rotate in a second direction opposite the first direction.

3. An apparatus according to claim 2, wherein said support means includes
a hollow, U-shaped supporting bracket having top and bottom portions,
first and second cylindrical bores formed in said top portion of said bracket,
first and second cylindrical bearing retainers fixedly received in said first and second bores,
first and second bearings received in said retainers, wherein one of said shafts is received in said first and second bearings, and
third and fourth cylindrical bores formed in said bottom portion of said bracket,
a third cylindrical bearing retainer fixedly received in said third and fourth bores,
a third bearing received in said third retainer,
wherein the other of said shafts is received in said third bearing.

4. An apparatus for remotely controlling the position of a mirror mounted on the outside of a vehicle comprising;

a mirror;

support means for said mirror mounted on the vehicle, said support means including a hollow bracket;

means for rotatably mounting said mirror on said support means;

power-amplified drive means for rotating said mirror; and control means associated with said drive means for actuating said power-amplified drive means and controlling the degree of rotation of said mirror, said means for rotatably mounting including two shafts, each fixedly mounted at one end to said mirror and rotatably mounted in said support means, one of said shafts having a spur gear fixedly mounted thereon within said support means, said drive means including
 a reversible electrical motor mounted within said support means, said motor having an output shaft with a sprocket rigidly secured at one end, and
 a chain link belt coupled to said sprocket and to said spur gear.

5. An apparatus according to claim 4, wherein said support means includes a hollow, U-shaped supporting bracket having top and bottom portions, first and second cylindrical bores formed in said top portion of said bracket, first and second cylindrical bearing retainers fixedly received in said first and second bores, first and second bearings received in said retainers, wherein one of said shafts is received in said first and second bearings, and third and fourth cylindrical bores formed in said bottom portion of said bracket, a third cylindrical bearing retainer fixedly received in said third and fourth bores, a third bearing received in said third retainer, wherein the other os said shafts is received in said third bearing.

* * * * *